(12) United States Patent
Knauss et al.

(10) Patent No.: US 10,948,379 B2
(45) Date of Patent: Mar. 16, 2021

(54) BUILDING SENSOR NETWORK FOR MONITORING ENVIRONMENTAL CONDITIONS

(71) Applicant: Sensor Industries Corp., Camarillo, CA (US)

(72) Inventors: Casey Knauss, Camarillo, CA (US); Neal Lassila, Ventura, CA (US); Jim Tyner, Camarillo, CA (US); Dave O. White, Camarillo, CA (US); Steve Smith, Ventura, CA (US); Michael Panesis, Camarillo, CA (US)

(73) Assignee: Sensor Industries Corp., Camarillo, CA (US)

( * ) Notice: Subject to any disclaimer, the term of this patent is extended or adjusted under 35 U.S.C. 154(b) by 44 days.

(21) Appl. No.: 16/795,180

(22) Filed: Feb. 19, 2020

(65) Prior Publication Data

US 2020/0225110 A1 Jul. 16, 2020

Related U.S. Application Data

(63) Continuation-in-part of application No. 15/166,166, filed on May 26, 2016.
(Continued)

(51) Int. Cl.
*G06Q 50/06* (2012.01)
*G01M 3/32* (2006.01)
(Continued)

(52) U.S. Cl.
CPC ......... *G01M 3/3254* (2013.01); *G08B 21/182* (2013.01); *G08B 21/20* (2013.01); *G08B 25/009* (2013.01); *H04W 84/18* (2013.01)

(58) Field of Classification Search
CPC .. G06Q 20/14; G01F 1/66; E03D 5/00; E03D 1/142; G01M 3/3254; Y02A 20/40; A63B 2210/50; A63B 2210/58
(Continued)

(56) References Cited

U.S. PATENT DOCUMENTS 8,341,106 B1 * 12/2012 Scolnicov .............. G06N 7/005
706/47
9,070,263 B1 6/2015 Peeters et al.
(Continued)

FOREIGN PATENT DOCUMENTS

WO 2014178920 A3 11/2014
WO WO-2014178920 A3 * 12/2014 ........... G05D 7/0635
(Continued)

OTHER PUBLICATIONS

Drew Prindle, "Leaving town? This box won't just detect a burst pipe, it will stop it automatically", Nov. 25, 2014, (Year: 2014).*
(Continued)

*Primary Examiner* — George Chen
*Assistant Examiner* — Freda A Nelson
(74) *Attorney, Agent, or Firm* — SoCal IP Law Group LLP; Guy Cumberbatch; Mark Goldstein

(57) ABSTRACT

Systems and methods for sensing water device run time, transmitting this data via a network to a database which analyzes, records and reports the individual run times and the aggregate use over any given timeframe. Sensors used to measure device use time do not directly measure flow rate, and may sense device run time by sensing water flow, through electronic signals, vibration, etc. The sensors may be battery powered and transmit discrete data packets via radio frequency to powered node units. A system of node units communicates with a central internet gateway which uploads the data packets to a cloud-based database which
(Continued)

organizes, analyzes, stores and reports the information. The system allocates the cost of water flowing through a common water meter to a plurality of individual units within a collection of geographically proximate units. The systems are useful in multi-unit buildings or complexes having stacked plumbing.

21 Claims, 8 Drawing Sheets

Related U.S. Application Data

(60) Provisional application No. 62/166,520, filed on May 26, 2015.

(51) Int. Cl.
  *G08B 25/00* (2006.01)
  *H04W 84/18* (2009.01)
  *G08B 21/18* (2006.01)
  *G08B 21/20* (2006.01)

(58) Field of Classification Search
  USPC .......... 705/412; 702/48, 50; 340/602, 870.2; 239/443, 526, 583; 4/325
  See application file for complete search history.

(56) References Cited

U.S. PATENT DOCUMENTS

| | | | | |
|---|---|---|---|---|
| 2002/0101355 A1* | 8/2002 | Young | .................. | G01F 1/26 340/606 |
| 2004/0199989 A1* | 10/2004 | Trolio | .................. | E03D 1/00 4/427 |
| 2006/0254651 A1* | 11/2006 | Hodge | .................. | G05D 7/0635 137/487.5 |
| 2007/0139208 A1* | 6/2007 | Kates | .................. | G08B 21/20 340/602 |
| 2008/0155905 A1 | 7/2008 | Willbanks | | |
| 2008/0243657 A1 | 10/2008 | Voysey | | |
| 2011/0193714 A1 | 8/2011 | Albert et al. | | |
| 2013/0085688 A1* | 4/2013 | Miller | .................. | G01F 1/66 702/48 |
| 2013/0113631 A1* | 5/2013 | Pitchford | .................. | G08C 17/02 340/870.02 |
| 2014/0006235 A1 | 1/2014 | Garg et al. | | |
| 2014/0163761 A1 | 6/2014 | Kuhns et al. | | |
| 2014/0279712 A1* | 9/2014 | Ortner | .................. | G06Q 30/04 705/412 |
| 2014/0337107 A1 | 11/2014 | Foster | | |
| 2016/0163177 A1* | 6/2016 | Klicpera | .................. | G08B 21/18 137/59 |
| 2016/0265208 A1* | 9/2016 | Brackett, Sr. | .................. | E03D 1/00 |

FOREIGN PATENT DOCUMENTS

| | | | | |
|---|---|---|---|---|
| WO | WO-2015019299 A1 * | 2/2015 | ............. | G01R 22/00 |
| WO | 2016191616 A1 | 12/2016 | | |

OTHER PUBLICATIONS

World Intellectual Property Organization, International Search Report and Written Opinion for international application PCT/US2016/034471, dated Sep. 11, 2016, pp. 1-10.

\* cited by examiner

BUILDING SENSOR NETWORK FOR MONITORING ENVIRONMENTAL CONDITIONS

RELATED APPLICATION INFORMATION

This application is a continuation-in-part of U.S. patent application Ser. No. 15/166,166, filed on May 26, 2016, which claims priority from provisional application No. 62/166,520 filed on May 26, 2015, which are incorporated by reference in their entireties.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Since the advent of standardized units of measurement, fluids, inclusive of water, have been measured in pints, quarts, gallons, liters, etc. At the distribution level, water has typically been measured in cubic feet, 100 ft.$^3$ and acre foot designations. Most water purveyors bill by 100 ft.$^3$ increments. Consequently, most multifamily apartment complexes, hotels, timeshare resorts, student housing complexes, hospitals, military bases, and other multi-office/unit commercial buildings (aka multi-unit properties) receive their bill in 100 ft$^3$ increments with a rate per 100 ft.$^3$ applied to the total water delivered. To encourage water conservation, purveyors have adopted the practice of tiering the water usage so that as total water usage progresses into each tier, the price is increased per 100 ft.$^3$ delivered.

Leaky toilets are the #1 cause of indoor water loss in residential buildings. A leaking toilet with a stuck-open flapper will lose up to 5,000 gallons a day, which equates to an average cost of about $90/day. More than 20% of all toilets leak, and each can waste up to 200 gallons a day. Multi-unit property companies are particularly affected by water leakage, and always strive to reduce costs, and thus improve operating income, while simultaneously conserving water one of earth's most precious resources.

Consequently, identifying and correcting water leaks is a huge priority for multi-unit property owners. Cost-effective solutions that identify and control unseen wasted clean water while saving multi-unit property companies thousands each month in utility costs are needed.

Further, due to increasing water conservation initiatives and mandates across the U.S., are becoming the norm. And finding ways and methods to decrease the amount of water used by each person or building, that can be accomplished without, significantly, requiring residents, guests, office workers, owners, or patients changing their day to day usage patterns, behaviors and interactions with water devices (such as toilets), or other water fixtures.

SUMMARY

The present application provides solutions for identifying and correcting two types of water leaks and resulting water loss and early warning of water intrusion events in buildings, in particular large-scale multi-unit properties. The two types of sensor/solutions are 1. Toilet Leak/Toilet Malfunction Sensor (passive and active versions) and 2. Water Intrusion/Flood Detection Sensor(s). Disclosed are systems with a sensor mesh network monitoring the most likely sources of water leaks and water intrusion events from plumbing infrastructure failures, including water heaters, air conditioning units, and any environment which uses water. Flood sensors are placed in locations especially prone to leaks, including toilets, plumbing and appliances, and also in locations where water leaks are most likely to be detected. Toilet Sensors are installed on each toilet or other unit/location and coded to the specific unit number via a mobile install application. Mesh Network Repeaters are plugged in throughout the property to create a wireless mesh network. Devices are connected to a single internet gateway installed on the property. Data are fed into a software application and analyzed, and management is notified of leaky toilets or other leaks in real-time.

The water intrusion/flood and toilet sensors both seamlessly connect to the mesh network with an easy plug-n-play set-up that requires no wiring—just scan a serial number and add location to the database. Preferably, an audible alarm sounds and/or notification via text, email, or other means is transmitted once water has been detected for a certain period such as 10 seconds. Each sensor is designed for long inexpensive coin-cell battery life, with low maintenance, ultra-low electrical power consumption, and high reliability.

Once a mesh network is installed for any initial sensor type, property companies can layer a wide range of additional sensors as developed for increased management efficiency. For instance, additional sensors include light meters for protecting valuable museum artwork, or carbon monoxide, smoke, and occupancy monitors for saving lives, or door open/closed sensors for security.

Systems and methods for sensing water device run time, transmitting this data via a network to a database which can analyze, record and report the individual run times and the aggregate use time over any given timeframe. Sensors used to measure device use time do not directly measure flow rate, and may sense device run time by sensing water flow, through electronic signals, vibration, or other ways. The sensors may be battery powered and transmit discrete data packets via radio frequency to powered node units. A system of node units communicates with a central internet gateway which uploads the data packets to a cloud-based database which organizes, analyzes, stores and reports the information. The system allocates the cost of water flowing through a common water meter to a plurality of individual units within a collection of geographically proximate units. The systems are useful in multi-unit buildings or complexes having stacked plumbing.

The systems described herein enable apportionment of a single water bill determined by a single water meter provided by a water purveyor. The bill, being comprised of charges based upon standard volumetric measurements i.e. cubic feet, is apportioned amongst multiple users based upon their individual water run time use signatures and/or number of iterations of water use as determined by sensors placed on applicable water use appliances. The data generated by the sensors is reported through a network comprised of hardware components enabled by embedded software code with, which is then uploaded into an Internet cloud-based database that organizes, analyzes, stores, and reports the data for the purpose of making the apportionment.

The particular software and processors utilized may vary, but for the sake of accessibility and flexibility the programs are preferably stored on a cloud server such as Amazon cloud computing platform, a branch of Amazon Web Services. The language used may also vary, some exemplary languages being Python, C++ and Java. In addition, predictive and autonomous decisions may be facilitated through the use of artificial intelligence (AI) programs integrated within the computing service or program. For instance, patterns of water flow over periods of time may be predicted and adjusted using AI.

An exemplary method for allocating the cost of water from an overall supply of water provided to a plurality of individual users of the water, includes sensing run times from a plurality of different type of water use devices registered to the individual users without sensing actual water flow magnitudes through the water use devices. Data including the run times, corresponding type of water use device and registered user is transmitted through a network of hardware components enabled by embedded software code. The data is uploaded into an Internet cloud-based database which has the functionality of organizing, analyzing, storing and reporting the data. A proportion of water use is calculated by analyzing the data for each individual user, and a proportional cost of water from the overall supply is allocated to each individual user.

Another method disclosed herein allocates the cost of water flowing through a single water meter to a plurality of individual units within a collection of geographically proximate units. A network of sensors is provided, each associated with a water use device, there being different types of water use devices, and the sensor being adapted to record and store information on device run times, the corresponding type of water use device and the corresponding individual unit in which the water use device resides. The method transmits the information from the network of sensors to an Internet cloud-based database which has the functionality of organizing, analyzing, storing and reporting the information. The method then calculates a proportion of water use by analyzing the information for each individual unit, and allocates a proportional cost of water to each individual unit in the building.

In an exemplary system, the following components are preferably used:

A sensor attached to or in proximity of a primary water use appliance which can record each iteration and/or the time of water run time use and transmit that data packet via radio frequency.

A unit node acting as a radio repeater connected to a continuous power source which can capture the sensor data packets and forward them to an Internet gateway device providing connectivity to an Internet cloud-based database.

A Gateway device that provides continuous two-way Internet connectivity.

Software, resident and embedded in the processors of the hardware components of the apparatus which creates the radio frequency data transmission network.

The network software also has the ability to: ensure accurate data transmittal, report malfunctioning hardware, bypass malfunctioning hardware by reassigning data transmission to functioning components, and be able to deliver program updates to all hardware components and construct and transmit compact data packets to ensure that battery driven sensors maintain a battery life of a minimum of three years.

A database application, resident in the Internet cloud that can accept, process, analyze and record the data generated by the sensors and transmitted by the network software via the unit node/repeaters and the Internet Gateway device and make that data available for the construction of various reports and active notifications.

Algorithms contained in the database application which can analyze for specific water use events which indicate a malfunctioning water use appliance and report that malfunction to the owner of the apparatus via email and/or telephonic text message.

One preferred system for allocating the cost of water from an overall supply of water provided to a plurality of individual users of the water, each individual user having at least one water use device, comprises a plurality of sensors each associated with a single water use device. Each sensor creates data packets that include information regarding a duration the associated device runs, a type of the associated device, and the identity of the corresponding user, and a time stamp, and transmits the data packets via radio frequency. A unit node connected to a power source located to receive the data packets transmitted from the sensors forwards the sensor data packets to an Internet gateway device. The Internet gateway device is adapted to transmit the sensor data packets to an Internet cloud-based database manager which has the functionality of organizing, analyzing, storing and reporting the information. The database manager determines if the duration of device run is more than a standard duration for a similar water use device and transmitting a device malfunction signal as a consequence, and also generates a report to show the proportion of water use for each individual user. The sensors are associated with corresponding water use devices by sensing the duration of water flow through the device, by sensing the duration of time the device operates, or by sensing when the device operates.

Preferably, at least some of the water use devices are toilets and the associated sensors connect to water inlets for the toilets, wherein the sensor includes a sensing element that senses water flowing through the water inlet. The software may determine if any sensed duration of water flow exceeds an expected amount for one flush, or exhibits a pattern of water flow over a certain period of time which the AI determines as a malfunction (i.e. leaky flapper) and transmits a toilet malfunction signal as a consequence. The toilet malfunction signal is preferably sent via an email or text alert to a system manager. More generally, the software may determine if any sensed duration of water flow exceeds an expected amount for each water use device and transmits a malfunction signal as a consequence. The system may further include a sensor to monitor overall usage of water flowing through the single water meter and transmitting the information to the internet-based database manager, wherein the software also compares different time periods of overall usage to detect abnormal overall usage, and wherein the software also compares any abnormal overall usage events with the time stamp from individual data packets to identify a particular water use device leak.

The system of claim 11, wherein the software also communicates the proportional volume of water usage and/or cost of water to each individual user for a particular billing period along with information on tiered pricing of the water and a reminder of incentives for reducing water consumption.

Using the exemplary systems and processes, water users are charged based upon their use of water as determined by the comparable water run time signatures and iterations of use of their fellow, similarly situated users. Similarly situated users can be defined as occupants in a multi-occupant building doing basically the same thing and having similar water use needs. The data gathered and transmitted by the system is used to create a usage list of all similar tenants and occupied units, i.e. two people occupying a one-bedroom, one bath unit, showing the total time and iterations that said tenants used each water use appliance over a given billing period. The data contained in the list can be used to create ratios allowing the total water bill for the property to be apportioned to each tenant based upon their respective total water run time and/or iterations of use of each recorded primary water use appliance. The prime example of the use of this method would be to apportion a master water bill amongst the tenants of multiple occupant buildings primarily multifamily housing though inclusive of multi-occupant commercial, industrial and retail buildings.

Being able to apportion the water bill amongst similarly situated multiple users should provide the same effect as installing physical submeters wherein once the multiple occupants are responsible for their fair share of the water use, they conserve water. In a single meter building, this conservation of water lowers the water bill thereby increasing the net operating income for the investment property owner. Various efforts incentivizing water savings and vice a versa can be implemented with the understanding that the allocation of water use for individual users or units is very accurate.

The hardware and software components required to make up the physical system are typically identified as sensor mesh systems. The sensor mesh systems disclosed herein are designed to apportion water use based upon the water run time signatures and iterations of water use appliances.

Importantly, by comparing current data with historical data from the same water use appliance or similar water use appliances our system can determine if there is a malfunction in the water use appliance causing it to waste water. By the timely correction of the malfunction water fixture or device (such as a toilet) can be conserved and the water bill will not be increased by wasted water. Again, lowering the water bill increases the net operating income of the investment property owner.

Figure 1:
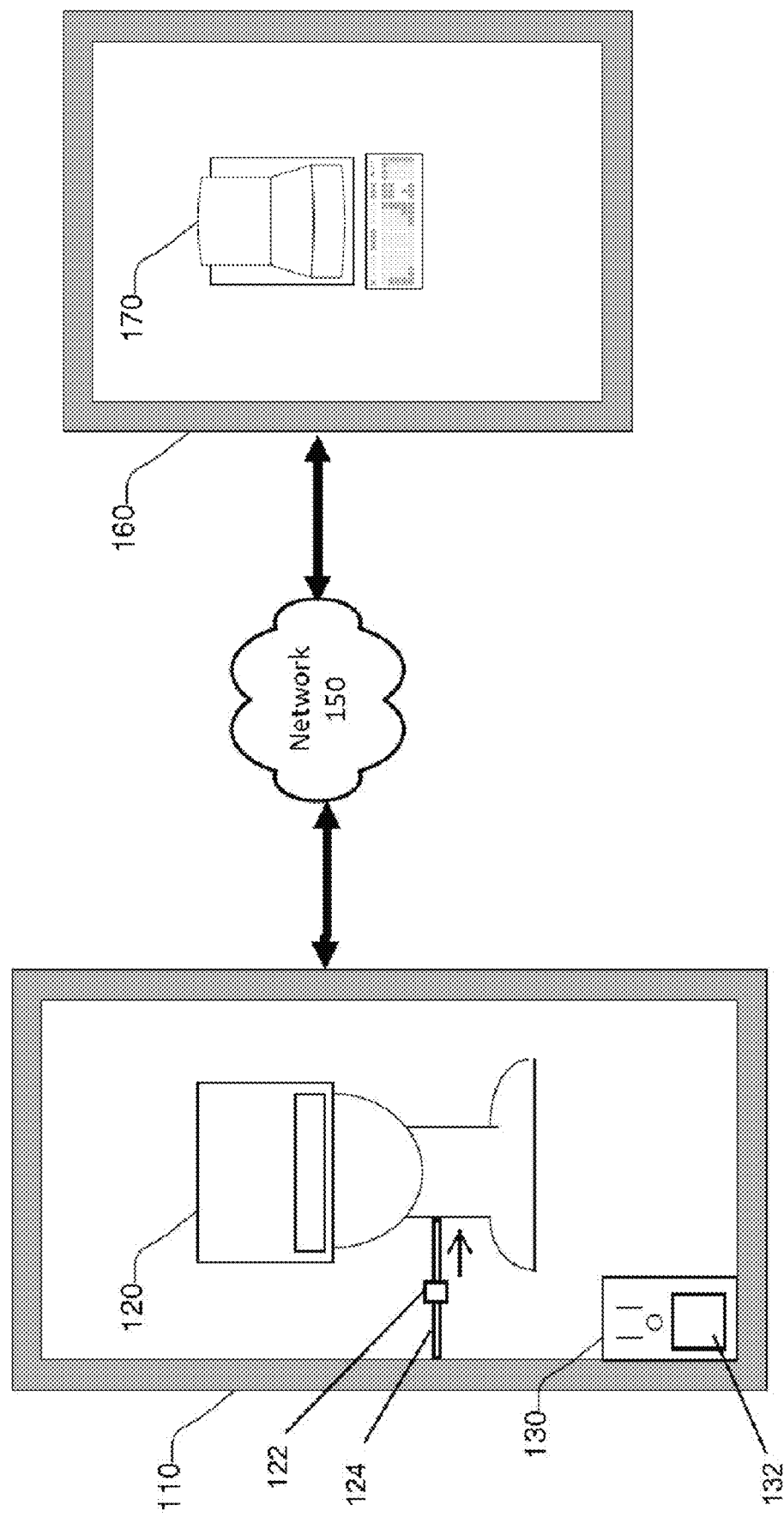
FIG. 1 is a block diagram of an environment for an apparatus for measuring water flow.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Volume vs Time

Described herein is a system that is designed to be used in multi-unit properties which may include rental apartments or condominiums. Typically, multifamily complexes have been constructed with what is called "stacked plumbing" wherein the individual apartment units share primary water piping. As such, water usage to each unit cannot be metered because there is not a unique water entry point for each unit. Consequently, a standard practice in these complexes has been to include the cost of water within the rent payment. Because the tenants never see the cost of water allocated by their individual use, they have no financial incentive to conserve water nor do they have any usage data points, such as provided by the volume of water used and its cost as shown in an individual water bill, to measure their own usage.

However, as the cost of water has risen in price, it has supported the creation of a system by certain service provider companies who provide sub-metered utility billing to the multifamily industry. These service providers read meters and create tenant bills based upon information provided by submeters which are installed in individual apartment units for gas, electricity and, for those complexes in which water submeters can be installed. To address those complexes where water submeters cannot be installed, a water cost allocation program can be used called "Ratio Utility Billing," or RUBs.

RUBs is used to allocate the total water bill amongst all the tenants based upon metrics designed to differentiate one apartment unit from another. However, because water usage is not being metered, the only known metrics are the square footage of the apartment, the number of bathrooms, the presence of clothes washers and/or dishwashers and the number of authorized occupants of the unit. A simple example is that if a complex consisted of 100, one bedroom, one bath units all having a clothes washer and a dishwasher, occupied by two people, then each unit would be billed 1% of the complex's monthly water bill, allocated to indoor water usage, excluding that allocated to exterior landscaping.

While RUB s billing effectively can recapture the total cost of the water used for the complex, it does not fairly allocate water usage by individual unit. This is because the water use practices of the tenants can vary greatly. All tenants believe that other tenants are doubtlessly using more water than they are using. Statistically, only 50% of those tenants are correct. Because of human nature, most tenants believe that they are paying more than their fair share. The tenants then are not incentivized in any way to conserve water and in fact take the attitude that they are "going to get their money's worth" and total water usage can actually increase for the complex.

Because of the ever-increasing rise in water rates in most areas and the imposition of mandated conservation measures in many areas, apartment owners have increasingly taken to constructing new complexes with individual water meters and installing submeters in those complexes that can be physically retrofitted. Statistics show when complexes that are retrofitted with water meters that provide the objective data point of individual water use to the tenant, along with the financial incentive of paying for the water that they actually use, that the water usage goes down in these complexes anywhere from 20% to 39%.

The challenge then becomes how to provide water use data to the tenants of the 25,000,000+ units that cannot be physically sub-metered. It is to answer this challenge that the solutions in the present application have been developed.

Description of Apparatus

The apparatus described herein involves the installation of sensor devices on the primary water use appliances or devices in an apartment unit. These include, but are not limited to: the toilet, the shower, the clothes washer and dishwasher. These four water uses will typically account for in excess of 80%+ of all of the indoor water use within a complex. The term "water use device" as used herein refers to all primary sources of water use. In a residence, for example, the toilet, shower, clothes washer and dishwasher account for most of the water use, but other devices such as sinks, patio hoses, and the like may be included. For commercial uses the term "water use device" may refer to the same plus appliances like ice makers, soda machines, etc.

It should also be understood that the sensor devices ("sensors"), come in a variety of forms none of which directly measure water flow rate. The use of water flow meters to measure flow rate through pipes and devices is of course known, but their use sometimes involves tedious and expensive regulatory approvals. In contrast, the sensors described herein measure various parameters whose functionality is not regulated in such a stringent manner.

The sensors described herein are "associated with" a single water use device. The term "associated with" is intended to encompass various ways of attaching or incorporating the sensors into the particular device such that they measure device run time. For example, a preferred toilet leak sensor described below includes a plumbing fitting which is directly installed in series with the water inlet. The sensor actually comes in contact with the water flow, even though it does not measure flow rate. Instead, the sensor communicates when the water starts flowing and when it stops so as to be able to transmit when and for how long a toilet runs. Alternatively, another type of sensor might sense device run time electronically, such as an on/off sensor installed at the time of manufacture or retrofit into a device such as a clothes washer or dishwasher. In that case, the on/off sensor is "associated with" the water use device, even though it does not come into direct contact with the water flowing through device. Another type of sensor may be mounted to the device to sense vibrations during running of the device. Another type of sensor might be mounted so as to detect sounds emanating from the device when it is running. It will thus be clear to those of skill in the art that various types of sensors may be associated with various types of devices, all of which are capable of reporting on/off events and/or run times.

Finally, as will be explained below, the various types of devices that can be monitored have different water use profiles. A shower running for 10 minutes may use more water than a dishwasher during any one 10-minute period within its run cycle. The present application anticipates such differences in calculating the total water used.

One important aspect of the present application is a toilet leak sensor, which is a key component in the water conservation system for multifamily communities. The EPA and the American Water Works Association completed a major study of indoor water use and determined that 12% of all indoor water use is wasted by being lost down leaking and malfunctioning toilet flapper valves. Consequently, the ability to identify and alert multifamily property managers to defective flapper valves or flapper valves that have become stuck open should reduce indoor water use on average by that same 12% on a continuing basis. However, our test installations quickly revealed that up to 40% of flapper valves may be defective even in well-maintained buildings. As such, any given apartment building may have a significantly higher baseline of water waste due to flapper valve issues than the 12% average.

The toilet leak sensor consists of an injected molded, 3.6 inch plumbing fitting. The interior of the fitting contains a magnet which moves anytime water is flowing into the toilet tank. The water supply valve is turned off, the water supply line to the tank is disconnected from the tank fill valve, the fitting is screwed onto the tank fill valve, the water supply line is attached to the fitting and the water supply valve is turned on. Inside the structure on the fitting is a coin battery operated sensor board which contains a reed switch, a processor and a radio transmitter. The sensor board has its own unique serial number which is used to identify in which apartment unit that particular sensor has been installed. The coin battery lasts several years before replacement is required.

Any time the water level in the toilet tank drops due to a flush, slow leakage from the flapper valve or from a stuck open flapper valve, the toilet tank fill valve runs to refill the tank. The water flow through the Toilet Leak Sensor moves the magnet inside the fitting which closes the reed switch. The processor records the amount of time that the reed switch is closed and then transmits this information via the radio transmitter to the network software which is embedded in Unit Node/repeaters, sensors and gateways installed as part of the system. The sensor mesh network sends this data to the database management and reporting application. This information is both stored for reporting purposes but in the case of a stuck open flapper a text alert can be sent to property management so that the problem can be immediately corrected as a stuck open flapper can waste as much as 120 to 150 gallons of water per hour.

Referring now to FIG. 1, there is shown a block diagram of an environment 100 for an apparatus for measuring water run time. The environment 100 includes a first location 110, a network 150, and a second location 160. The first location 110 may comprise an apartment building. In the first location 110, there may be a toilet 120, and an electrical outlet 130. The second location 160 may comprise a computing device 170. The computing device may be operated by a user, not shown. The environment 100 may be implemented using distributed computing and interconnected by a network 150. The computing device 170 is shown as a computer. However, the computing device can include any similar devices that may be connected to the first location 110. The computing device 170 is described below with reference to FIG. 2.

The computing device 170 is used by users who desire to view various information regarding the apparatus that is measuring the water run time. In addition, users use the computing device 170 to monitor the system. The "user" is the person or entity interacting with the system to review the status of the apparatus measuring the water run time, and also monitoring the status of the various sensors connected to the various water appliances.

The system includes a sensor mesh. A sensor mesh is created by physically installing a network of sensors and radio signal repeaters which report to a gateway with a connection to the Internet Cloud. In the Cloud the sensor generated data can be stored and manipulated in a database. The physical components of the sensor mesh are controlled by a software network application which operates within a defined radio frequency to manage the radio traffic of the data packets being sent by the sensors and the repeaters.

A Sensor Mesh is created through a combination of hardware components consisting of sensors, repeaters and a device that connects to the Internet. This hardware is made functional by a radio network transmitting and receiving software application that gathers the sensor data and feeds it through the Internet to a database that processes, stores and manages the data generated by the sensors. Traditionally, high density sensor mesh technology has been used in environments such as manufacturing where various types of sensors are installed on the production equipment to provide continuous feedback on the functionality of the processes involved in the production cycle. Many of the sensors are small and located in areas which require them to be battery-operated. Battery life is generally not a concern because of the availability of ongoing maintenance for both the equipment and the sensors. The biggest drain on a small battery powering a sensor is the current expenditure required for the actual radio transmittals of the data being generated by the sensor. Existing off-the-shelf sensor network applications have been designed to work with multiple types of data which requires that they have a large, overhead file structure regardless of the actual size of the data packets which they carry. Transmitting these large file structures causes a relatively rapid discharge of the battery.

The challenge of establishing a sensor mesh in a multifamily building is that, unlike a factory floor, the tenants' apartment units are their homes and it would be inappropriate to interrupt their lives through the need to replace sensor batteries every few months. Consequently, a specially designed sensor mesh is used in this system. The sensor mesh in this system has been specifically designed to eliminate extraneous file structures to transport the specific data packets generated by our sensors. This allows an extended sensor battery life to several years. Because of the potential density of smart home sensors in a multifamily environment, the sensor mesh is designed to also be able to map out the transmission path of each sensor data packet back to our Internet Gateway where the data can be uploaded into our cloud-based database manager. Because our Unit Node/repeaters can hear multiple sensors from multiple apartments, many iterations of the same data packet can be picked up by the sensor mesh hardware. The sensor mesh is able to discard all replicas of the same data packet so that only one iteration of the data packet reaches the Internet Gateway. This is critical because it would be extremely difficult to construct a database to sort multiple, replicated data packets. Because of the limited accessibility of sensor mesh hardware installed in the multifamily environment, sensor mesh can communicate bi-directionally so that we can automatically download every update of the sensor mesh software. This gives our customers the satisfaction of knowing that their sensor mesh is always operating with the most current version of the sensor mesh.

These sensor devices that are attached to a primary water use appliance, such as a toilet, report via the system's proprietary radio network to a Unit Node/repeater. The Unit Node/repeaters are about 2"×3" and may plug directly into an electrical outlet allowing 110 Volts. For example, a Unit Node/repeaters 132 may be plugged directly into electrical outlet 130 as seen in FIG. 1.

Because the Unit Node/repeaters are plugged into the electrical system, it is possible to use the most powerful, miniature transmitters to ensure that all data events are transmitted to the Gateway. The board contains a powerful radio transceiver, a processor and memory. The sensor mesh network software is installed on each Unit Node/repeater board. Each board has its own exclusive serial number which is used to map the sensor mesh network and determine which Unit Node/repeater is installed in each apartment unit. As with the sensors attached to the primary water use appliances, the board can also receive information back from the computing device 170 which allows a user to continuously upgrade the capabilities of the SI-Mesh network by downloading all enhancements automatically.

The purpose of the Unit Node/repeater is to create the physical sensor mesh within a multifamily complex. Unit Node/repeaters are installed in the complex, minimally in every other apartment unit to a continuous power source. The Unit Node/repeaters pick up the radio transmissions from the various sensors in the apartment units. A Unit Node/repeater in a particular apartment unit is not limited to hearing just the sensors within that apartment unit; it can hear sensors next door, above and below and many within a range of as much as 300 feet. The network may sort through these multiple receptions and ensure that only one report of a specific sensor data event reaches the gateway where it is transmitted to a cloud-based database application. Once the Unit Node/repeaters are installed, the building or complex has been virtually wired, with wireless transmission capability.

The network allows the Unit Node/repeaters to act as repeaters of signals from other Unit Node/repeaters so that no matter how far away a particular apartment unit is from the Gateway, the data from that apartment reaches the Gateway. Like every sensor, each Unit Node/repeater reports into the system periodically so that if a Unit Node is removed or malfunctions, the property manager can be notified of that fact. Should a Unit Node/repeater go off-line for any reason, the network automatically "heals" the sensor mesh network by reassigning any sensors reporting to that Unit Node/repeater to other nearby Unit Node/repeaters so that no sensor event data is lost.

It is important to note that the Unit Node/repeaters have been specifically designed to receive and transmit data not only from the sensors attached to the primary water use appliances, but also for all types of environmental reporting and security. These sensors can monitor such environmental activity as fire and smoke detection, carbon monoxide detection, moisture sensors for indoor flooding events and security sensors attached to doors and windows to report unauthorized entry events. Once the sensor mesh is established in the building, other general building sensors can be installed such as mainline water monitoring for catastrophic leak detection, fire and smoke detection in common areas such as laundry rooms, carports, and security sensors for private building areas.

These Unit Node/repeaters also act as signal repeaters which transmit this data, via the proprietary radio network, to an Internet gateway device which feeds the data into the system's cloud-based database management system. This data is then organized into a dynamic reporting system which aggregates the water run time use of each device within the apartment unit and creates a comparative list of the proportional water run time use by each similarly defined unit within a complex. This data is arranged by apartment unit and complex and made available to apartment owners for review and import into existing tenant billing and property management systems. However, algorithms embedded in the database software can recognize both leaking and stuck open toilet flapper valves and will proactively notify management and maintenance so the problem can be fixed in a timely manner.

The system also includes a gateway. The gateway purpose is simple. The gateway runs the sensor mesh network software, and it gathers the sensor generated data sent by the Unit Node/repeaters and uploads it into a cloud-based, database manager. It may be physically connected to the Internet via a standard Ethernet cable plugged into an Internet connected router. Alternatively, it may be connected to the Internet through a Wi-Fi connection.

The Gateway is small and may be able to fit into the palm of a person's hand. Typically, it is only about 3"×4" and about three quarters of an inch high. The faceplate contains a standard connector for a cat 5 cable and the electrical connector for the transformer which plugs into any 110-power source, preferably protected by a surge protector. The cat 5 cable makes the connection to an Internet router. This router might be resident in the apartment manager's apartment, or a dedicated Internet connection can be made available in the building's utility room or even in an attic crawlspace. Typically, only one Gateway is required per complex as a single Gateway can manage the traffic from several hundred Unit Node/repeaters reporting several thousand sensors.

The Gateway contains a special board to convert the sensor generated data into Internet protocol. To do this, the Gateway undertakes two-way communications with the Unit Node/repeaters by sending a message to a Unit Node/repeater when it has received a unique data packet of information. The redundancy built into SI-Mesh allows each data packet generated by a sensor to be sent multiple times to make sure that the data packet gets through to the database. Obviously, to cut down on data packet traffic, it is important to be able to acknowledge receipt of the data packet so that the Unit Node/repeaters can cease sending any additional copies of that data packet. The Gateway also contains a powerful radio transceiver communications board. The Gateway also can receive automatic software updates for itself and also transmits those updates to the Unit Node/repeaters which send the software updates to the various sensors located in the apartment units.

The uniqueness of this apparatus is that it does not seek to measure water consumption by standard units of measurement such as gallons or cubic feet. What it does is measure the time that each water appliance is using water and the iterations of water use by that appliance. The assumption is that similar water use appliances will use similar volumes of water over an equivalent time of usage so that by measuring that water run time, unique tenant water usage profiles can be created.

As mentioned above, the present application senses water use device run or operation times, and translates that information into a proportional water use for individual users or units. For example, the most common water use devices in a residence are the toilet, shower, the clothes washer and the dishwasher. Each of these devices has unique water use profiles. For example, a toilet has a relatively constant water use per flush, and thus the duration of water use is not as important as the number of times that water is used (i.e., number of flushes). Likewise, a dishwasher has various cycles, not all of which require water flow, and thus may use less water than even a shower which runs for much less time. Consequently, standard or expected water use profiles for the various devices are known, and the number of times each device runs (iterations) and the duration of the run provides the system with information which can be translated into a predicted water usage. Of course, as mentioned elsewhere, the duration of time that each device runs can be compared against an expected duration to sense malfunctions; in particular for toilets which are not expected to fill for more than 20 seconds or so.

The primary benefit of the systems described herein is apportioning the amount of water use between individual units in a multi-unit building or complex. In addition, the system preferably includes a robust malfunction detection capability to help identify leaks and send instant alerts to water managers. As stated above, time signatures that capture both iterations and duration of use are desirably combined with a time stamp that memorializes when during a 24-hour period the time signature was created. By monitoring of the time signatures for abnormalities, the water manager can detect when a leak is present. Knowledge of the time of day when the abnormality occurs can be utilized to identify where the leak is. That is, if the system detects a continually running toilet starting at 2 AM in the morning, the data can be scanned to determine who operated a toilet at 2 AM in the morning.

The computing device 170 may include software and/or hardware for providing functionality and features described herein. A client system may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client systems 110, 120 and 130 may include various specialized units, circuits, software and interfaces for providing the functionality and features described here. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by a client computer and others by other devices.

The network 150 may be or include a local area network, a wide area network, wireless networks and the Internet. The network 150 interconnects the Unit Node/repeater connected to the electrical outlet 130 in the first location 120 to the second location 160. The network 150 enables communication of data between the various interconnected elements.

Figure 2:
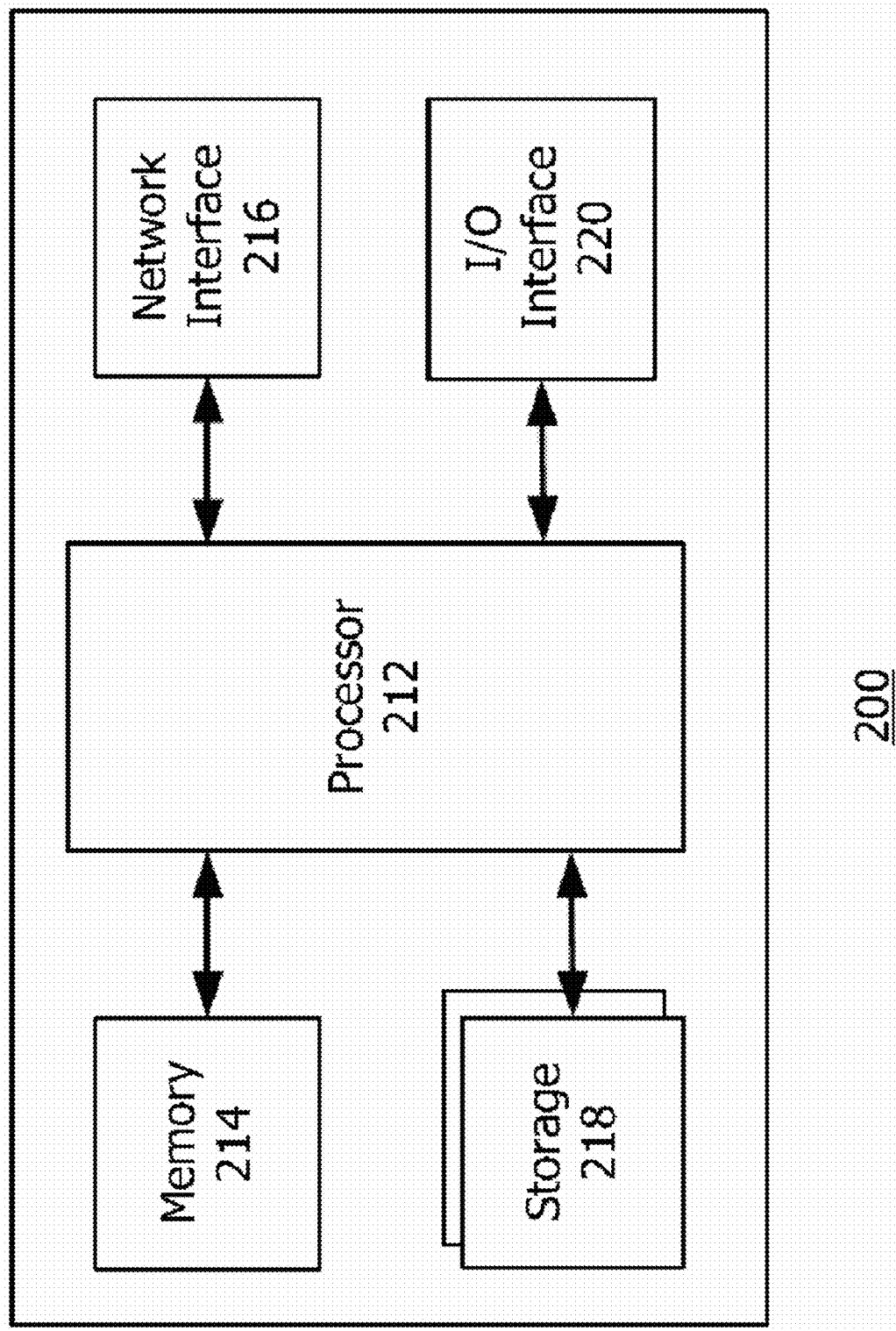
FIG. 2 is a block diagram of a computing device.

Turning now to FIG. 2, there is shown a block diagram of a computing device 200, which is representative of the computing device 170, as seen in FIG. 1. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 212 coupled to a memory 214, storage 218, a network interface 216 and an I/O interface 220. The processor 212 may be or include one or more microprocessors, field programmable gate arrays (FPGAs), application specific integrated circuits (ASICs), programmable logic devices (PLDs) and programmable logic arrays (PLAs).

The memory 214 may be or include RAM, ROM, DRAM, SRAM and MRAM, and may include firmware, such as static data or fixed instructions, BIOS, system functions, configuration data, and other routines used during the operation of the computing device 200 and processor 212. The memory 214 also provides a storage area for data and instructions associated with applications and data handled by the processor 212.

The storage 218 provides non-volatile, bulk or long-term storage of data or instructions in the computing device 200. The storage 218 may take the form of a magnetic or solid-state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 218 and does not include transitory media such as signals or waveforms. In some cases, such as those involving solid state memory devices, the memory 214 and storage 218 may be a single device.

The network interface 216 includes an interface to a network such as network 150 (FIG. 1).

The I/O interface 220 interfaces the processor 212 to peripherals (not shown) such as displays, keyboards and USB devices.

By example, simply counting the number of toilet flushes generated by two similar units, it can be determined which unit is occupied a greater percentage of the time. Consequently, a one bedroom, one bath unit occupied by a retired couple who are in residence most of the time should generate more flushes than the adjacent one bedroom, one bath unit occupied by a working couple who spend most of the day at their workplaces.

Even this one additional objective data point can make a standard RUBs ("Ratio Utility Billing") billing system more equitable. Adding the objective data points from the number of minutes of shower usage, dishwasher usage and clothes washer usage adds further refinement to the RUBs system. More importantly, giving tenants information on their comparative use of the shower, dishwasher and clothes washer allows them to see how their personal water usage compares to that of their fellow tenants. This can then give them the type of objective data, similar to that provided by a submetered water bill, on which they can act to modify their water use habits to actually reduce their usage resulting in water conservation.

Because the water use appliances in a given multifamily complex will tend to be standardized and homogenous, it becomes unnecessary to measure the actual volume of water use to get a reasonably fair comparison of water usage by the tenants.

Once this comparative list of water usage is created, a more precise and equitable allocation of the total water bill can be generated for ratio utility billing purposes. Further, even if the apartment owner does not want to allocate the total water bill, the owner can impose a tiered financial incentive system based upon which percentile tier a particular unit might achieve. With a tiered financial incentive system, those in the higher tiers are incentivized to move down to less expensive tiers while those in the less expensive tiers are incentivized not to move up into a higher cost tier. This should result in an overall reduction in water usage thereby achieving the goal of not only lowering the cost of indoor water to the complex owner but also to the greater good of actually conserving water use.

These systems and methods disclosed herein are especially useful for crafting effective incentive and disincentive regimes. For one thing, the relatively objective measurement of water usage provides confidence in the data. The users can be provided with highly specific usage information over a period of time so that they can intelligently determine how best to reduce usage. The present application contemplates an overall plan for a particular multi-unit dwelling that will ultimately reduce water usage. The specific data for each unit and for individual water use devices are provided to the individual ratepayers for any one billing cycle along with a tiered system of incentives and disincentives. Over time, if one or the other fails to induce a change in water use behavior, the incentives and disincentives may be modified.

The system includes three hardware components; the sensor units, the Unit Node/repeaters and the Internet gateway.

Exemplary toilet sensor units 122 as seen in FIG. 1 are comprised of a proprietary design, injection molded fitting which is placed in the water supply line 124 to the toilet 120. Each sensor has a unique serial number that is registered with the particular toilet. The fitting contains a magnet which moves when water flows through the fitting. The fitting also contains a proprietary sensor board of approximately 1"×1" in size which is powered by a self-contained coin battery. When the magnet reaches its limit of travel within the fitting, it activates a reed switch on the board which initiates a time signature for as long as the reed switch is closed by the magnet. As soon as the water flow ceases, the magnet, via gravity, returns to its resting place which disengages the reed switch and completes the time signature for that water use event. An example of the custom designed fitting can be seen in FIG. 1.

The sensor board performs three primary functions. The first is to create a sensor time signature based on what is sensed along with a time stamp, the second is for the onboard processor to process this data and create a data packet which can then be sent via the third function which is the transmittal of the data packet via a radio chip on the board.

Additional types of sensors will be added to the system which can measure the water run time signatures of the shower/bath, clothes washer and dishwasher. Accordingly, the term "time signature" refers to a particular event initiated by operation of the water used device. The time signature includes information as to when the device operates and how long it operates. That is, the time signature captures both iterations and duration of use. As will be explained below, the time signature is preferably combined with a time stamp that memorializes when during a 24-hour period the time signature was created.

The Unit Node/repeater contains a board approximately 2"×3" in size. These Unit Node/repeater are either powered by plugging into a standard 120 V outlet or they can be powered by being installed in the wall behind an existing thermostat which has 24 V power supplied by the HVAC unit. By being plugged into a continuous power supply, the radio transmitters on the board can be significantly more powerful than the battery-powered radio transmitters on the sensor boards.

The function of the Unit Node/repeater is primarily twofold; the first is to collect and then amplify the data from the sensor boards so that it can eventually reach the systems Internet gateway connection. The second is to have resident within its processor the proprietary network software that manages the flow of data packets from the sensor boards.

The Unit Node/repeater have the ability to hopscotch amongst themselves to receive and then relay the sensor board data until it eventually reaches the Internet gateway connection.

The third proprietary piece of system hardware is the Internet gateway which basically acts like a standard router to receive the data packets from the sensor mesh network and transmit them up to the proprietary database management cloud application.

All three hardware components are of proprietary design physically, electronically and in functionality by board resident firmware.

The system also includes software as part of the functionality for the system's hardware. The software includes functionality to control the firmware, the operating system, and the management system.

The software for the firmware has been developed to control the functionality for the proprietary sensors, Unit Node/repeater and gateway boards. It is board resident and controls the data flow at the board level between the sensor, the processor and the radio transceiver.

The sensor mesh network operating system, is the network data management system which is resident on the Unit Node/repeater and gateway boards. The operating system maps and assigns sensor data packet pathways amongst the Unit Node/repeater mesh and the gateway so that only a single iteration of a sensor's data transmittal reaches the gateway. It has been specifically developed to manage the data being transmitted via radio frequency in such a way as to minimize draw on the sensor coin type batteries so that they can function without replacement for up to 3 years.

The operating system also provides the communication foundation for adding many additional types of sensors. These can add data points to an individual unit's water run time use profile. However, the operating system can handle data transmittals from the many different types of sensors used to create a smart home environment.

The cloud-based database management system includes all of the data generated by the sensors. This database consists of a user interface that allows the system's subscribers to create company and multifamily housing complex profiles which include the individual physical profile of each unit within the complex. Multiple sensor serial numbers can be assigned to each unit within the complex the components of hardware mesh network are installed. Creating the profiles of the complex and each unit also creates the data tables into which the water run time use data is placed. Proprietary algorithms analyze the data as it is submitted to determine aberrant water run time use patterns that might need immediate attention by the complex owner. The database has an alert system that utilizes text and e-mail contact when aberrant water run time use patterns are detected. The database also contains reporting features so that subscribers may view their water run time use data both onscreen and export that data into printed report format. The database has application interface capability so that the data can be exported in standard data formats to other applications such as utility billing applications and property management systems.

Figure 3:
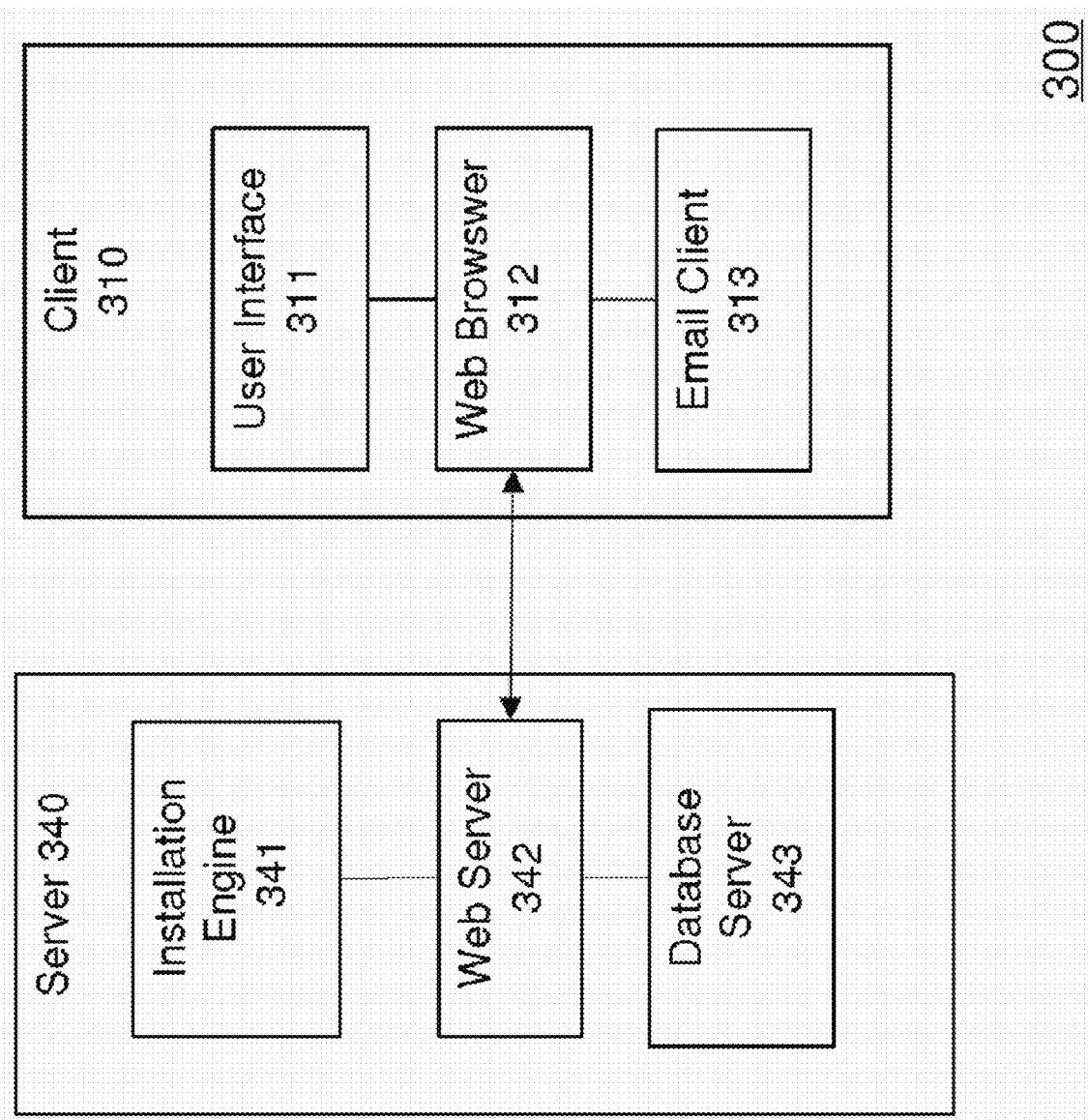
FIG. 3 is a block diagram for an apparatus for measuring water flow.

Turning to FIG. 3, there is shown a block diagram for an apparatus measuring water run time. The system 300 comprises a server 340 and a client 310, such as computing device 170 in FIG. 1.

The server 340 comprises an installation engine 341, a web server 342, and a database server 343.

The installation engine 341 comprises functionality to install the required components of the system. For example, an installation engine would first check to see if the sensors, the Unit Node/repeaters and the gateway were properly installed.

The server 340 may also comprise a web server 342 and a database server 343. The server 340 is shown as a single server incorporating a database server 343 and a web server 342. The server 340 may actually be a number of interrelated servers and computing resources. In this way, the database server 343 may be a stand-alone server separate and apart from the web server 342. The database server 343 and web server 342 may also be made up of a number of physical servers, each logically linked and operating in concert. The server 340, however physically configured, is responsible for accessing the database server 343 databases to thereby provide the web server 342 with information to fill web pages served to the client 310.

The client 310 comprises a user interface 311, a web browser 312, and an email client 313. A user 330 interacts with the apparatus for measuring water run time 300 via the user interface 311 on the client 310. The client 310 includes a web browser 312 and an email client 313. The client 310 incorporates a web browser 312 for accessing web pages served by the web server 343. The client 310 also includes an email client 313 for receipt of emails from the server 340 regarding alerts from the system regarding the water run time in the system.

Description of Processes

Figure 4:
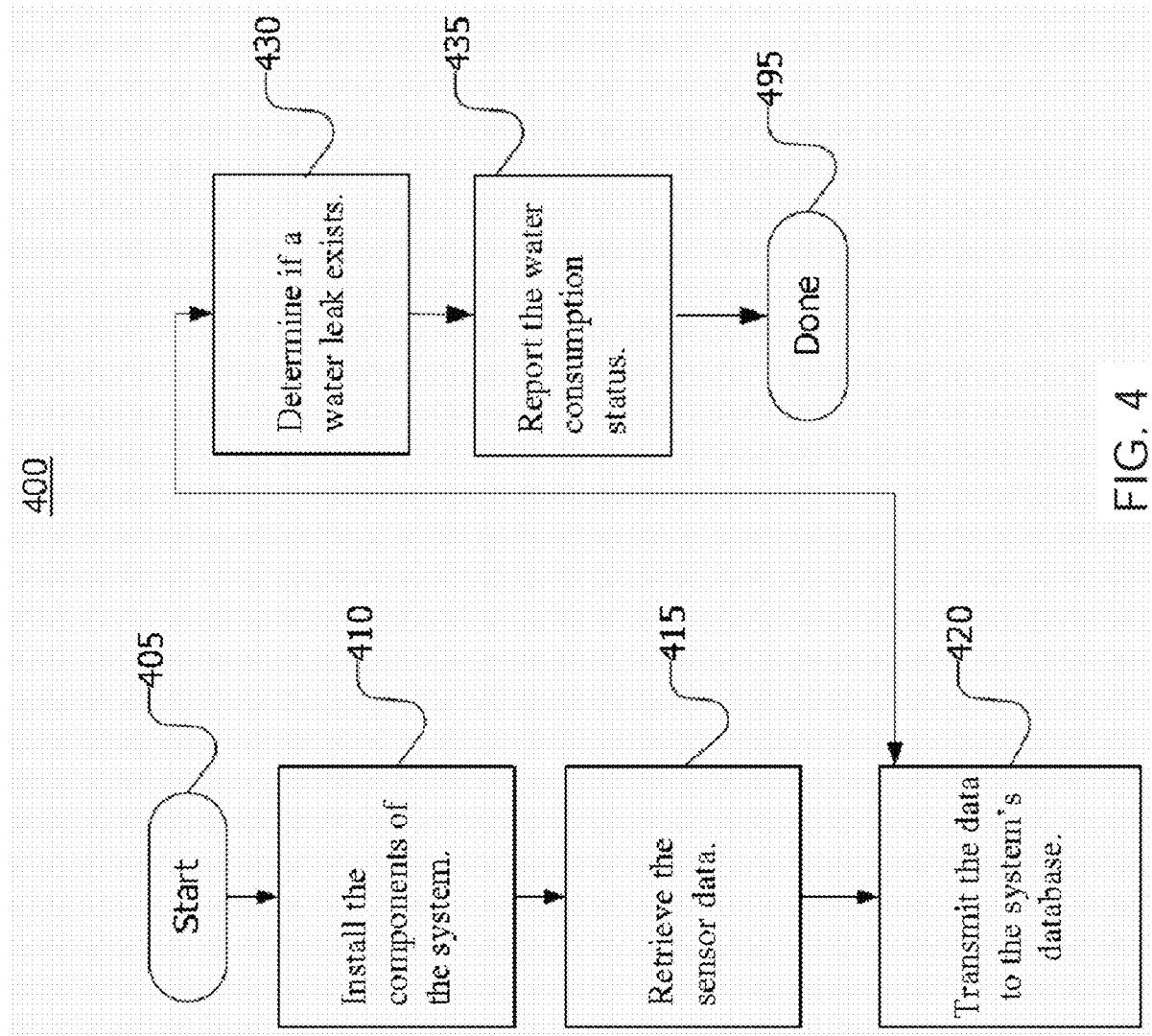
FIG. 4 is a flowchart of a process performed by an apparatus for measuring water flow.

Referring now to FIG. 4, a flowchart of a process performed by an apparatus for measuring water flow is shown. The water run time flowchart 400 has both a start 405 and an end 495, but the process is cyclical in nature.

At 410, the system components are installed. The first step in the process is to install the various components in the system, namely the sensor for the primary water use appliances, the Unite Node/repeater and the gateway.

At 415, the system retrieves the sensor data. The sensor data is the data that measures the water run time. For example, if the sensor is placed on a toilet, the sensor may provide the number of flushes as part of the sensor data.

At 420, the system transmits the sensor data to the database. Here, the system transmits all of the water run time data, such as the number of flushes, how often the appliance is used, for how long, and similar data points.

At 430, the system determines if a water leak exists. Here, the system performs various algorithms to determine if water is running longer or more often than normal. Again, in the example of a toilet, the sensor will monitor the number of flushes occurring on the toilet. If the system notices that more water is flowing than is attributable to the number of flushes, then the system may send an alert to the user to inform him that there could be a leak.

At 435, the system reports the water run time status to the database. The system then displays on the user interface the amount of water run time from the various water use appliances that were being monitored.

Drywall Sensors

Figure 5A:
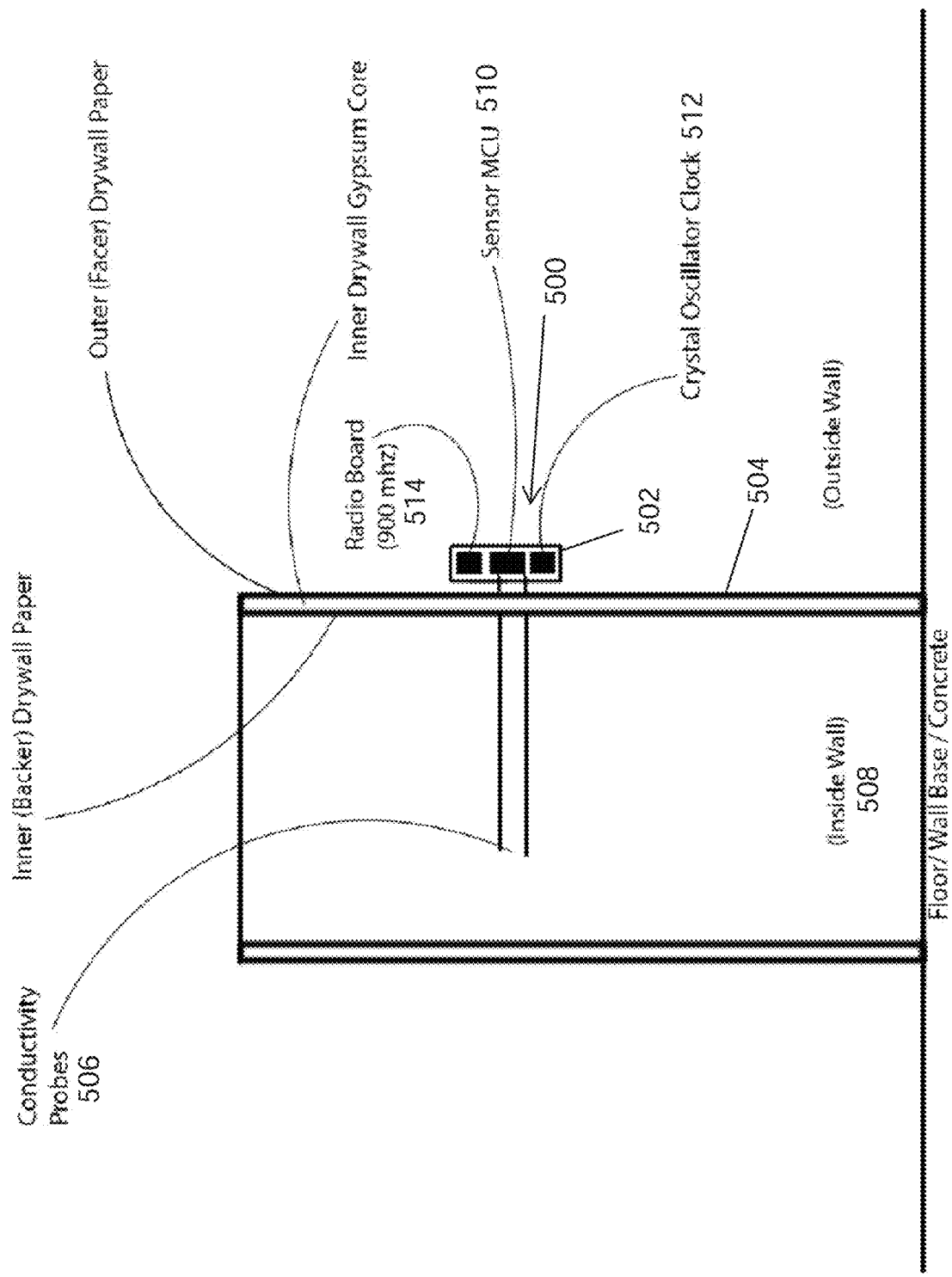
FIGS. 5A-5C are schematic diagrams of several exemplary drywall sensors mounted in walls and suitable for integration in a mesh of sensors.
Figure 5B:
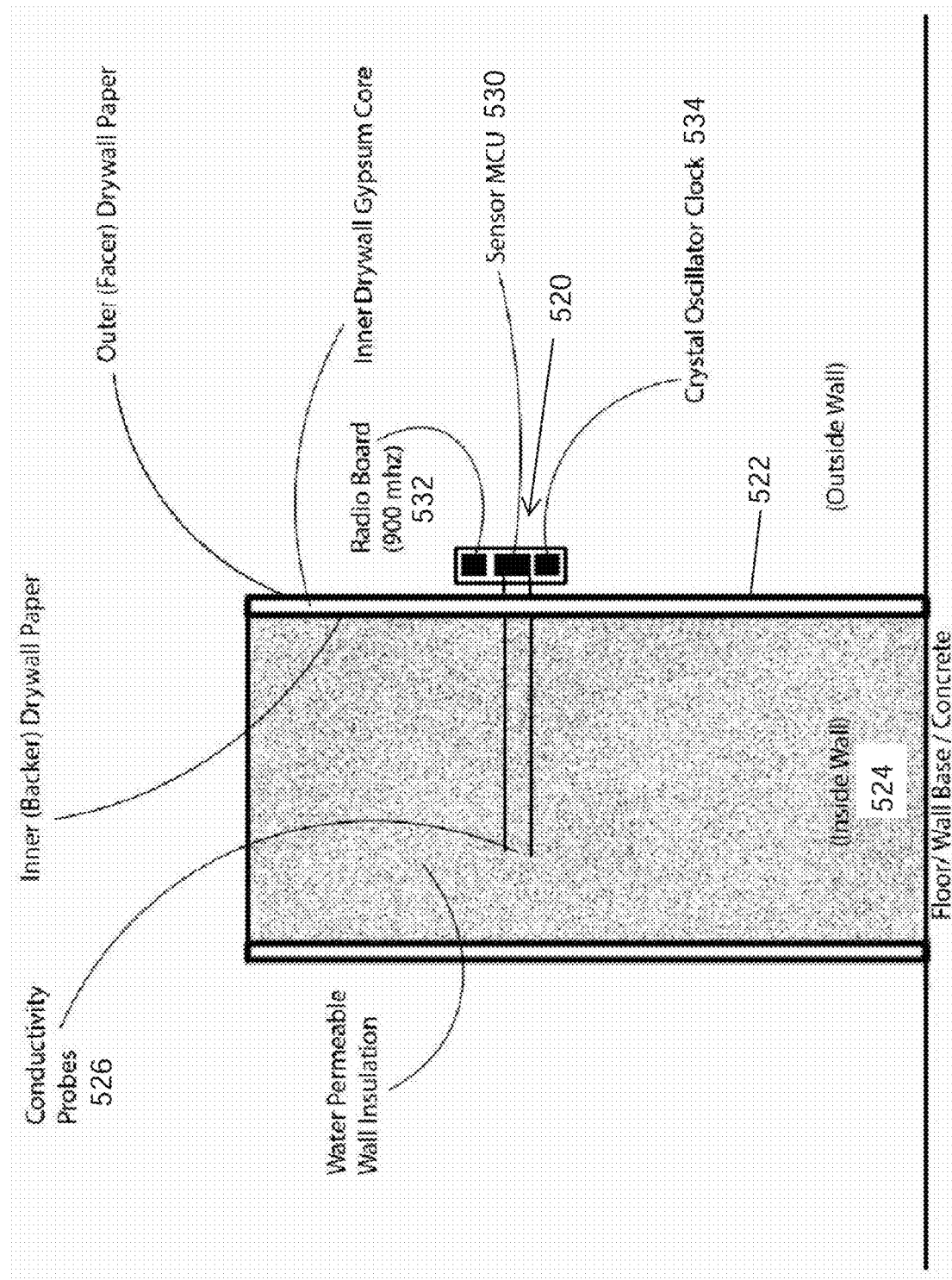
Figure 5C:
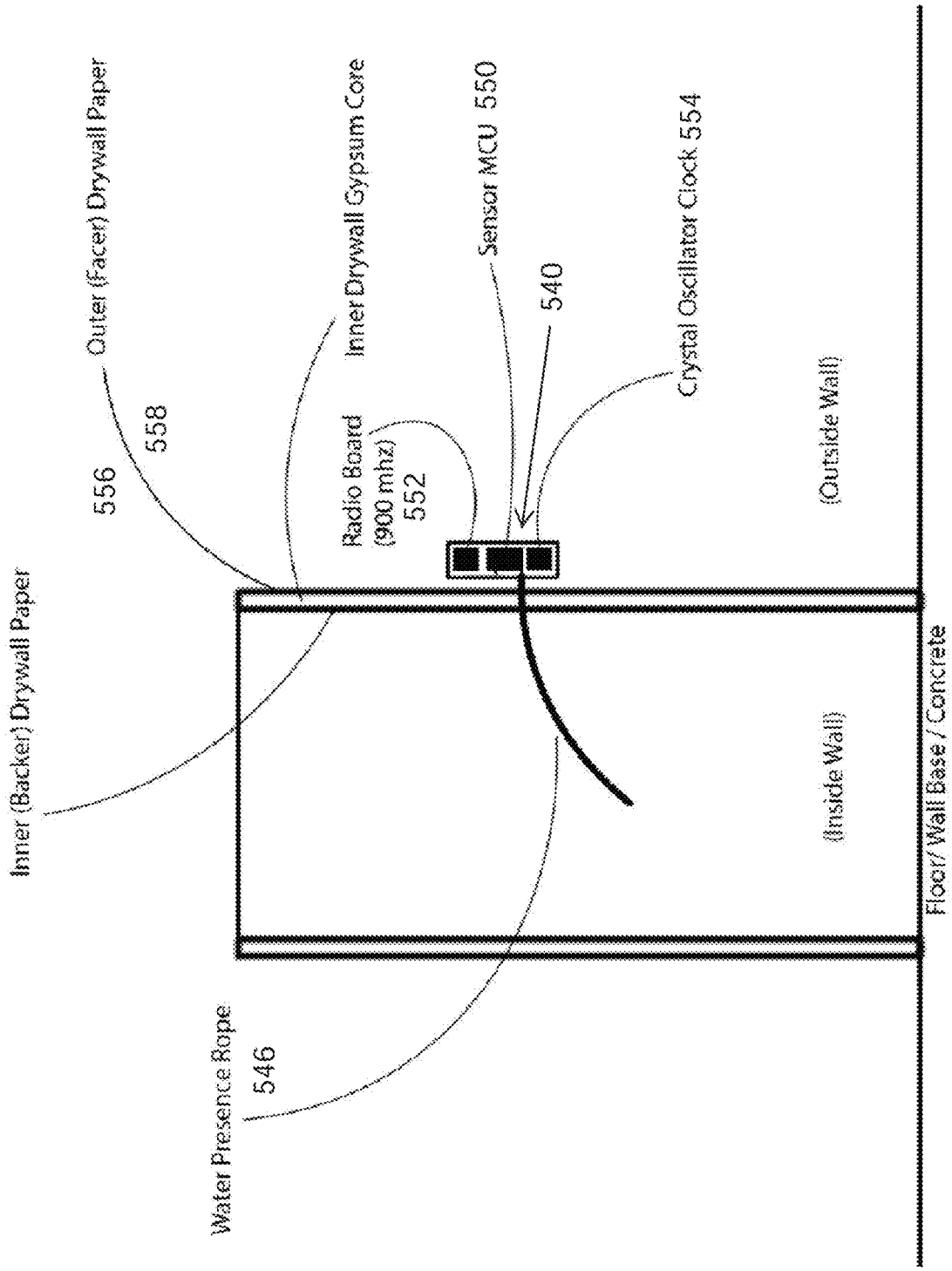

FIGS. 5A-5C are schematic diagrams of several exemplary drywall sensors mounted in walls and suitable for integration in a network of sensors as described herein. FIG. 5A shows a sensor 500 having a sensor housing 502 mounted to a wall 504 and having a pair of probes 506 embedded into the wall and terminating in a (typically) hidden wall space 508. The wall 504 may be a variety of materials, such as drywall (also known as plasterboard, wallboard, sheet rock, gypsum board, buster board, custard board, or gypsum panel), wood, metal, even synthetics. However, the typical residential and multi-unit has drywall.

The sensor housing 502 mounts to the wall 504 using various means such as drywall anchors, adhesive, mounting brackets, etc. The probes 506 are desirably formed of stainless steel or other corrosion-resistance metal that is also conductive, or the probes 506 may be a non-conductive material such as plastic but have conductive elements incorporated therein. In general, there are two conductive probes 506 which are spaced apart a small distance so as to be able to conduct a current therebetween beyond a threshold of moisture in the atmosphere within the wall space 508.

The sensor 500 incorporates therein a sensor master control unit (MCU) 510, a crystal oscillator clock 512, and a radio board 514, which in the illustrated example has a broadcast frequency of 900 MHz The sensor 500 is configured to detect water or moisture that has saturated the drywall 504 and/or sense high humidity or water/moisture in the open wall space 508. Excess water in the wall 504 bridges the conductive gap between the probes 506 which activates the master control unit (MCU) 510. The crystal oscillator clock 512 generates electromagnet signals that enables the master control unit (MCU) 510 to count relative time (not using any clock or any method that requires the CPU to "know" time of day, etc.). If the master control unit (MCU) 510 senses moisture for greater than a predetermined time frame, from the number of signals generated by the clock 512, a leak detection state is triggered. The master control unit (MCU) 510 may take a variety of actions once a leak is detected, but the simplest is to generate a leak signal via the radio board 514, which is transmitted to a repeaters in the wireless mesh network described herein.

FIG. 5B shows an alternative sensor 520 which is substantially similar to the sensor 500 described above, but which is mounted to a wall 522 which has a solid interior 524 of, for example, water-permeable insulation. Probes 526, preferably of stiff metal such as stainless steel, are embedded directly into the wall interior 524. Once again, moisture in either the drywall exterior layer 522 or the wall interior 524 bridges a conductive gap between the probes 524 which activates a master control unit (MCU) 530 to generate a signal using a radio board 532. Once again, the sensor 520 preferably has a crystal oscillator clock 534 which permits the master control unit (MCU) 530 to keep track of relative time.

Finally, FIG. 5C shows a sensor 540 having a sensor housing 542 mounted to a wall 544 and having a flexible probe 546 embedded into the wall and terminating in a (typically) hidden wall space 548. Again, the wall 544 may be a variety of materials but is typically drywall.

The sensor 540 is configured and functions much like the sensors described above, with a probe 546 signaling a sensor master control unit (MCU) 550 which, in turn, prompts a radio board 552 to broadcast a leak signal. A crystal oscillator clock 554 provides a measure of relative time.

The flexible probe 546 is desirably a fully-integrated water/moisture present rope rather than a pair of stainless-steel probes, which may be useful for constricted or otherwise tortuous wall spaces. Other applications for the sensor 540 and flexible probe 546 are under carpets or installed against walls such as around corners to increase effectiveness and area coverage for detecting water presence. Water detecting ropes typically have two twisted metal conductor wires that are insulated from one another and surrounded by a highly absorbent and conductive polyethylene mesh braid jacket. When water contacts the rope, the wires are put in electrical contact and the sensor probe 546 will immediately send a signal to the master control unit (MCU) 550. One example of a suitable sensor rope is the Wireless Water Rope Sensor available from Monnit Corp. of Salt Lake City, Utah Active Sensor The present application contemplates the use of a variety of sensors throughout a particular building or complex, in including so-called "active" sensors which respond to specific triggers to significantly restrict or halt water flow if an abnormal pattern of water flow is detected. One ubiquitous example of such a sensor detects leaks at a toilet. In general, the "active" sensor will employ a valve or other shutoff mechanism, attached to the inflow/supply line of a toilet or other water fixture (i.e. shower head, faucet, hot water heater, etc.), after a leak event triggered by the system, to inhibit water flow to the fixture.

Figure 6:
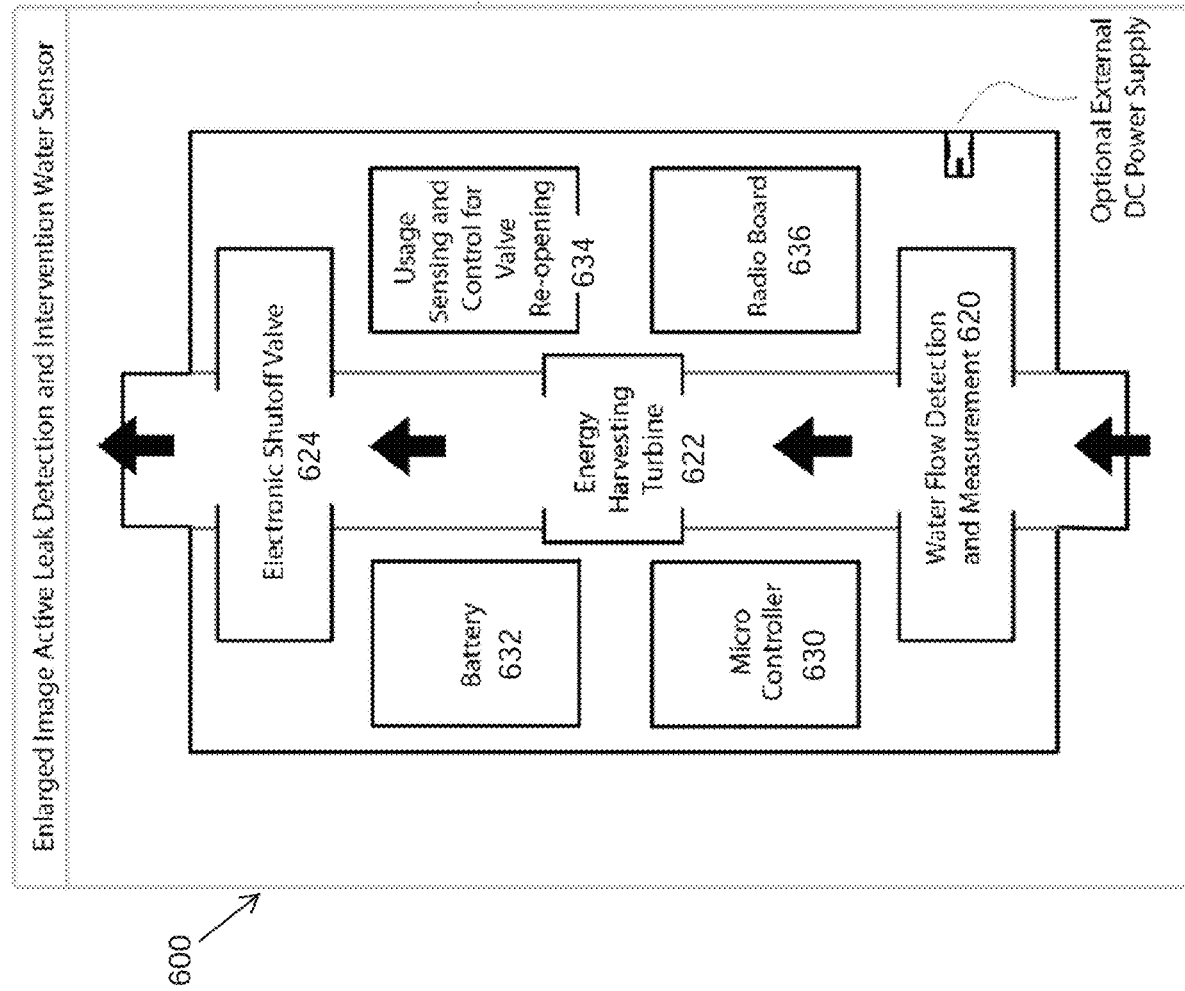
FIG. 6 is a schematic diagram of an active sensor that may be incorporated into a network of sensors described herein.

FIG. 6 is a schematic diagram of an active sensor 600 that may be incorporated into a network of sensors as described herein. The sensor 600 comprises a unit or housing 602 connected in series within a water supply line 604 between a manual shut off valve 606 and a toilet 608. Functional components of the active sensor 600 are indicated schematically in FIG. 6, and include a water flow detector 620, an energy harvesting tube 622, and an electric shut off valve 624, all of which are placed in series and in contact with the water flow. The valve 624 may be a ball valve or solenoid actuated, various ones of which are available, such as from US Solid of Cleveland, Ohio, and Electric Solenoid Valves of Lane Islandia, N.Y. Electronic components include a microcontroller 630, a rechargeable battery 632, a control unit 634 for the electronic shut off valve 624, and a radio board 636. An optional external DC power supply as shown may also be provided.

In a preferred embodiment, the energy harvesting turbine 622 rotates when water flows through the sensor 600, and generates a small amount of electricity which recharges the battery 632. The onboard turbine 622 also measure water flow through "counting" the number of revolutions of the turbine, which is more accurate than other methods (such as counting time). The data regarding the number of revolutions may be sent to the cloud system and database infrastructure real-time, or may be sent based on a predetermined, maximum time of continuous flow, or may be sent based on a predetermined maximum continuous revolutions (and thereby determining the amount of water flow), or in some combination before activating the valve or shutoff mechanism. An important feature of the active sensor 600 design and usage of the turbine 622 is this dual functionality, where both water flow is measured and energy harvested to enable trickle charging of the onboard battery simultaneously. Exemplary turbines 622 are the iMeter from MeterLogix of Eden Prairie, Minn. or the GOSO F50-12V Water Turbine Generator available from various online sellers.

The sensor 600 works by detecting unusual water flows. The water flow detector 620, which may be of a type as described above, is activated upon water flow through the water supply line 604. In a preferred embodiment, a vibration detection device 640 is coupled to the toilet flush handle, and is also electrically via a thin wire or wirelessly coupled to the microcontroller 630. The detection device 640 is typically mounted within the toilet tank adjacent the flush handle such that activation or motion of the flush handle generates a signal which is communicated to the sensor 600. One exemplary sensor 640 is the HDX-2 Vibration Sensor Switch for Arduino available from the online seller Gikfun of GuangDong, China.

This "passive" type of sensor does not require power as with some proximity sensors, and is thus more economical and simpler to install. In a typical scenario, a user flushes the toilet which is detected by the vibration detection device 640 such that water flow through the water supply line 604 is expected and does not trigger any alarms.

In contrast, if water flowing through the line 604 is sensed by the detector 620, but there is no vibration detected at the toilet flush handle (a "no flush" event), the microcontroller passes data to the Cloud computing platform (aka AWS) 630 senses a potential leak. Depending on a predetermined algorithm, the microcontroller 630 may broadcast a leaky toilet signal after one or more such "no flush" events. Sometimes the flush handle becomes stuck, in which case the microcontroller 630 may be programmed to only send the leaky toilet signal upon two or more of the "no flush" events. The active sensor is thus not dependent on time to determine when to close the valve. If there is no leak detected, the water will not be shut off via the valve 624. Only if a confirmed leak is detected does the microcontroller 630 trigger the valve to close.

Further, the sensor 600 is "active" in that it automatically enables resumption of water flow if/when a person approaches via motion or vibration detection or proximity sensing a point of use water fixture, or when a person uses the water fixture, or when a person interacts with a switch to enable water flow to begin. That is, following a leak event the point of use fixture and related water flow will remain inhibited unless/until a certain conditions occurs.

For instance, when a user approaches or touches the point of use water fixture, such action is detected by the sensor 600 or auxiliary device (e.g., proximity/motion or vibration sensor), and the sensor activates the valve or shutoff mechanism to allow water to flow once again. One example in the case of a toilet is when the user attempts to use the toilet (by either sitting down on the toilet seat or jiggling the flush handle). The interaction will activate the valve or shutoff mechanism to allow water to flow once again, and will remain on allowing water flow until or unless another leak or malfunction event is identified by the system (in which case the shutoff mechanism will activate to shut off the water.

Another scenario is the user or building maintenance person interacts with a smartphone app or a web site app to reactivate the water flow such that a guest or resident, etc. can use the toilet or other point of use water fixture again. Depending on the desired use experience, the sensor 600 and Cloud system can be programmed to allow the water to flow for an undetermined period of time or can be programmed to disable the shutoff valve permanently or until changed by the Cloud system smartphone app or website by building maintenance management. It should be noted that the ability to interact with the active sensor 600 as described implies that the sensor can be controlled by bi-directional communications with the smartphone app or website, and specifically that the sensor has the ability to respond to commands from the app or website.

Once the user has finished using the water fixture and leaves the immediate area, and after a pre-determined amount of time (determined by and programmed by the building management team), the active sensor 600 will activate the valve or shutoff mechanism to restrict water flow to the point of use water fixture until the next need to use the fixture.

The active sensor 600 also interacts with a mesh network as described herein such that data from the sensor are stored then forwarded to a Cloud database and system with AI to process and interpret the data, which enables identification of abnormal patterns of water use. Further, interaction with a mesh network such that the Cloud database and system is aware of when the active sensor is on or off requires that the sensor has enhanced programming and onboard memory which enables all of the aforementioned capabilities.

Closing Comments

Although the functionality of the water management system described herein is preferably implemented using cloud computing services, the processes and apparatus may be implemented with any computing service or device. A computing service or device as used herein refers to any device with a processor, memory and a storage device, and an I/O interface, that may execute instructions. The processor may be or include one or more processes such as microprocessors, graphic processors, co-processors, digital signal processors, and other processors, including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The memory may be or include RAM, ROM, DRAM, SRAM and MRAM, and may include firmware, such as static data or fixed instructions, BIOS, system functions, configuration data, and other routines used during the operation of the computing device and processor. The memory also provides a storage area for data and instructions associated with applications and data handled by the processor.

The storage may provide non-volatile, bulk or long-term storage of data or instructions in the computing device. The storage may take the form of a disk, tape, CD, DVD, or other reasonably high capacity addressable or serial storage medium. In this document, the term "storage medium" means a physical device or object for storing data and does not include transitory media such as signals or waveforms. Multiple storage devices may be provided or available to the computing device. Some of these storage devices may be external to the computing device, such as network storage or cloud-based storage.

The network interface may be configured to interface to a network such as a local area network, a wide area network, and/or the Internet.

The I/O interface may be configured to interface the processor to peripherals (not shown) such as displays, keyboards and USB devices.

The computing service or device may include software, firmware, and/or hardware for providing functionality and features described herein. The computing device may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computing device may include various specialized units, circuits, software and interfaces for providing the functionality and features described herein. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the processor and others by other devices.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for monitoring water flowing through water use devices in a plurality of individual units within a collection of geographically proximate units in a multi-unit building or complex, comprising:
providing a network of sensors, each sensor associated with a single water use device within an individual unit, each sensor including a magnet in a path of water flow configured to move to an activated position when water flows through the water use device and a sensor board external to the path of water flow, wherein movement of the magnet activates a switch on the sensor board which initiates a time signature as long as the magnet remains in the activated position, the sensor board being configured to a) create a sensor time signature, b) process the sensor time signature as well as a time stamp, c) create a data packet including the sensor time signature, time stamp and identity of the water use device, and d) wirelessly transmit the data packet;
wherein at least some of the water use devices are toilets and the associated toilet sensors connect to water inlets in series in water supply lines to each toilet, and each toilet sensor includes a vibration detection device coupled to sense movement of a respective toilet flush handle, wherein each toilet sensor incorporates a microcontroller which is programmed to broadcast a leaky toilet signal if water flows through the supply line without vibration detected at the toilet flush handle, and the toilet sensor further includes a shutoff valve in the water supply line to each toilet, the microcontroller further being programmed to activate the shutoff valve and shut off flow if water flows through the supply line without vibration detected at the toilet flush handle, the toilet sensor having a radio board for wirelessly transmitting and receiving and the microcontroller is configured to receive wireless instructions to de-activate the shutoff valve and open the flow;
retrieving data packets from the network of sensors using a mesh within the collection of geographically proximate units comprising a plurality of repeaters each connected to a power source, and wirelessly relaying the sensor data packets using the repeaters;
collecting the data packets at a central Internet gateway device located at the collection of geographically proximate units; and
transmitting the data packets to an internet-based database manager having software that analyzes the data packets and determines if a water use device associated with any one data packet is malfunctioning.

2. The method of claim 1, wherein at least some of the sensors are battery-powered.

3. The method of claim 1, wherein the software determines if any sensed duration of water flow exceeds an expected amount for one flush, and transmits a toilet malfunction signal as a consequence.

4. The method of claim 1, wherein the toilet sensors each have a battery and an energy harvesting turbine that rotates when water flows through the water supply line to generate electricity which recharges the battery.

5. The method of claim 1, wherein at least some of the water use devices are selected from the group consisting of: showers, clothes washers, dishwashers, sinks, patio hoses, ice makers, and soda machines.

6. The method of claim 1, wherein the mesh of repeaters also receives and transmits data from sensors selected from the group consisting of: fire detectors, smoke detectors, carbon monoxide detectors, moisture sensors for indoor flooding events, and security sensors attached to doors or windows.

7. The method of claim 1, wherein the mesh of repeaters also receives and transmits data from moisture sensors mounted to walls in individual units, each moisture sensor having a probe embedded in the wall to which it is mounted.

8. The method of claim 1, wherein the software determines if any sensed duration of water flow exceeds an expected amount for each water use device and transmits a malfunction signal as a consequence.

9. The method of claim 1, wherein each repeater has a circuit board, a radio transceiver, a processor and memory, and wherein the mesh of repeaters is configured to automatically heal itself in case a repeater fails by reassigning any sensors reporting to the failed repeater to another nearby repeater so that no sensor event data packet is lost.

10. The method of claim 1, wherein the microcontroller of each toilet sensor is further configured to de-activate the shutoff valve and open the flow upon the vibration detection device sensing movement of a respective toilet flush handle.

11. A method for monitoring water flowing through water use devices in a plurality of individual units within a collection of geographically proximate units in a multi-unit building or complex, comprising:
providing a network of sensors, wherein some of the sensors are associated with a single water use device within an individual unit, each sensor associated with a single water use device having a sensor board configured to perform the following upon a water flow event through the water use device a) create a sensor time signature, b) create a time stamp associated with the sensor time signature, c) create a data packet including the sensor time signature, time stamp and identity of the water use device, and d) wirelessly transmit the data packet;
wherein the network of sensors includes a network of moisture sensors mounted to walls in individual units, each moisture sensor having a conductive probe embedded in the wall to which it is mounted and configured to detect moisture in the wall, each moisture sensor having a master control unit (MCU), a crystal oscillator clock, and a radio board, and wherein the master control unit (MCU) is programmed to generate a leak signal via the radio board if the probe detects moisture in the wall for longer than a predetermined time frame determined by the crystal oscillator clock;

wherein at least some of the water use devices are toilets and the associated toilet sensors connect to water inlets for the toilets, and wherein the toilet sensors connected to water inlets for toilets are positioned in series in water supply lines to each toilet, and each toilet sensor includes a vibration detection device coupled to sense movement of a respective toilet flush handle, wherein the toilet sensor incorporates a microcontroller which is programmed to broadcast a leaky toilet signal only if water flows through the supply line without vibration detected at the toilet flush handle;

providing a mesh of repeaters within the collection of geographically proximate units each connected to a power source, including one repeater in proximity to a subset of the network of sensors, wherein the repeaters each have a circuit board, a radio transceiver, a processor and memory;

retrieving data packets from the network of sensors at one or more of the repeaters, and wirelessly relaying the sensor data packets using the repeaters;

collecting the data packets at a central Internet gateway device located at the collection of geographically proximate units, wherein the gateway device has a circuit board, a radio transceiver, a processor and memory; and transmitting the data packets to an internet-based database manager having software that analyzes the data packets and determines if a water use device associated with any one data packet is malfunctioning.

12. The method of claim 11, wherein at least some of the sensors are battery-powered.

13. The method of claim 11, wherein the software determines if any sensed duration of water flow exceeds an expected amount for one flush, and transmits a toilet malfunction signal as a consequence.

14. The method of claim 11, wherein at least some of the water use devices are selected from the group consisting of: toilets, showers, clothes washers, dishwashers, sinks, patio hoses, ice makers, and soda machines.

15. The method of claim 11, wherein the mesh of repeaters also receives and transmits data from sensors selected from the group consisting of: fire detectors, smoke detectors, carbon monoxide detectors, moisture sensors for indoor flooding events, and security sensors attached to doors or windows.

16. The method of claim 11, wherein the probe of each moisture sensor is a single flexible element.

17. The method of claim 11, wherein the software determines if any sensed duration of water flow exceeds an expected amount for each water use device and transmits a malfunction signal as a consequence.

18. The method of claim 11, wherein the mesh of repeaters is configured to automatically heal itself in case a repeater fails by reassigning any sensors reporting to the failed repeater to another nearby repeater so that no sensor event data packet is lost.

19. The method of claim 11, wherein at least some of the sensors are mounted to the water use device to sense vibrations during running of the device.

20. The method of claim 11, wherein at least some of the sensors are mounted so as to detect sounds emanating from the water use device when it is running.

21. The method of claim 11, wherein at least some of the water use devices are electronic appliances and the associated sensors sense device run time electronically.

* * * * *